(12) United States Patent
Shibata (10) Patent No.: US 9,515,524 B2
(45) Date of Patent: *Dec. 6, 2016

(54) ELECTRIC MOTOR

(71) Applicant: JTEKT CORPORATION, Osaka-shi, Osaka (JP)

(72) Inventor: Yoshiyuki Shibata, Toyota (JP)

(73) Assignee: JTEKT CORPORATION, Osaka (JP)

( * ) Notice: Subject to any disclaimer, the term of this patent is extended or adjusted under 35 U.S.C. 154(b) by 748 days.

This patent is subject to a terminal disclaimer.

(21) Appl. No.: 13/940,518

(22) Filed: Jul. 12, 2013

(65) Prior Publication Data

US 2014/0021817 A1    Jan. 23, 2014

(30) Foreign Application Priority Data

Jul. 23, 2012   (JP) .................................. 2012-162936

(51) Int. Cl.
*H02K 21/14* (2006.01)
*H02K 1/27* (2006.01)
*H02K 21/04* (2006.01)

(52) U.S. Cl.
CPC .......... *H02K 1/2713* (2013.01); *H02K 21/046* (2013.01); *H02K 21/14* (2013.01); *H02K 1/2766* (2013.01); *H02K 1/2773* (2013.01)

(58) Field of Classification Search
CPC ............................. H02K 21/046; H02K 21/14
See application file for complete search history.

(56) References Cited

U.S. PATENT DOCUMENTS 3,411,027 A * 11/1968 Rosenberg ............. H02K 19/26
310/156.49
4,757,224 A * 7/1988 McGee .................. H02K 21/44
310/111

(Continued)

FOREIGN PATENT DOCUMENTS

JP    A-2010-233346      10/2010
JP    2011-067048 A       3/2011

(Continued)

OTHER PUBLICATIONS

Jul. 7, 2015 Extended Search Report issued in European Patent Application No. 13177224.6.

(Continued)

*Primary Examiner* — Dang Le
(74) *Attorney, Agent, or Firm* — Oliff PLC (57) ABSTRACT

An electric motor has a supplementary field magnet including a supplementary magnet, a yoke serving as a magnetic path for magnetic flux produced by the supplementary magnet. The supplementary field magnet is arranged on one axial end side of the rotor with a gap. A rotor core is provided with first projections projecting toward one axial end side of the electric motor from first magnetic pole portions having a first polarity, and second projections projecting toward the one axial end side from second magnetic pole portions having a second polarity, and arranged radially inward of the first projections. The yoke includes a magnetic pole portion axially opposed to the first projections and having the first polarity, and another magnetic pole portion axially opposed to the second projections and having the second polarity such that a gap is formed between the magnetic pole portions.

1 Claim, 5 Drawing Sheets

(56) References Cited

U.S. PATENT DOCUMENTS

| | | | |
|---|---|---|---|
| 6,462,449 B1 * | 10/2002 | Lucidarme | H02K 1/2706 |
| | | | 310/156.56 |
| 6,900,570 B2 * | 5/2005 | Ifrim | H02P 9/302 |
| | | | 310/180 |
| 7,057,323 B2 * | 6/2006 | Horst | H02K 21/16 |
| | | | 310/191 |
| 2004/0189132 A1 | 9/2004 | Horst | |
| 2008/0036331 A1 | 2/2008 | Mizutani et al. | |
| 2009/0295249 A1 | 12/2009 | Kinjou et al. | |

FOREIGN PATENT DOCUMENTS

| | | |
|---|---|---|
| JP | 2011-182622 A | 9/2011 |
| WO | 01/42649 A2 | 6/2001 |

OTHER PUBLICATIONS

Jul. 7, 2015 Extended Search Report issued in European Application No. 13 17 7223.8.
May 6, 2016 Office Action issued in U.S. Appl. No. 13/940,529.
Jul. 14, 2016 US Office Action Issued in U.S. Appl. No. 13/940,529.

* cited by examiner

ELECTRIC MOTOR

INCORPORATION BY REFERENCE/RELATED APPLICATION

This application claims priority to Japanese Patent Application No. 2012-162936 filed on Jul. 23, 2012 the disclosure of which, including the specification, drawings and abstract, is incorporated herein by reference in its entirety.

BACKGROUND OF THE INVENTION

1. Field of the Invention

The invention relates to an electric motor.

2. Discussion of Background

Conventionally, there has been an electric motor that includes a so-called "embedded magnet rotor" in which permanent magnets are embedded in a rotor core so that the permanent magnets are fixed to the rotor core (for example, Japanese Patent Application Publication No. 2010-233346 (JP 2010-233346 A)). In an electric motor including such an embedded magnet rotor, in addition to magnet torque by permanent magnets, reluctance torque is generated. Therefore, the electric motor including the embedded magnet rotor has an advantage over an electric motor including a so-called "surface magnet rotor" in which permanent magnets are fixed to a surface of a rotor core, in that the electric motor including the embedded magnet rotor is able to generate higher torque.

In order to increase magnet torque, it is necessary to increase an amount of magnetic flux that is transmitted between a stator and the rotor, in other words, a magnetic flux density on an outer periphery of the rotor core. However, employment of permanent magnets having a larger maximum energy product is only one effective measure to increase the magnetic flux density on the outer periphery of the rotor core in the above-described conventional configuration. Therefore, there has been a demand for creation of a new technology that makes it possible to increase a magnetic flux density on an outer periphery of a rotor core regardless of the performance of permanent magnets embedded in the rotor core.

SUMMARY OF THE INVENTION

The invention provides an electric motor configured such that a magnetic flux density on an outer periphery of a rotor core is increased.

According to a feature of an example of the invention, there is provided an electric motor, including: a stator fixed to an inner periphery of a housing; and a rotor arranged radially inward of the stator, and having a rotor core and a plurality of embedded magnets that are embedded in the rotor core so as to be fixed to the rotor core, the embedded magnets being arranged such that a magnetic pole with a first polarity and a magnetic pole with a second polarity are arranged alternately in a circumferential direction on an outer periphery of the rotor, wherein the rotor core is provided with a first projection that projects toward at least one axial side of the electric motor from a first magnetic pole portion of the rotor core, in which the magnetic pole with the first polarity appears in the outer periphery, and a second projection that projects toward at least one axial side of the electric motor from a second magnetic pole portion of the rotor core, in which the magnetic pole with the second polarity appears in the outer periphery, the second projection being arranged radially inward of the first projection, on at least one axial side of the rotor, a supplementary field magnet having a supplementary magnet is arranged, and the supplementary field magnet includes an outer magnetic pole portion that has the first polarity and that faces the first projection in an axial direction, and an inner magnetic pole portion that has the second polarity and that faces the second projection in the axial direction such that a gap is formed between the inner magnetic pole portion and the outer magnetic pole portion.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
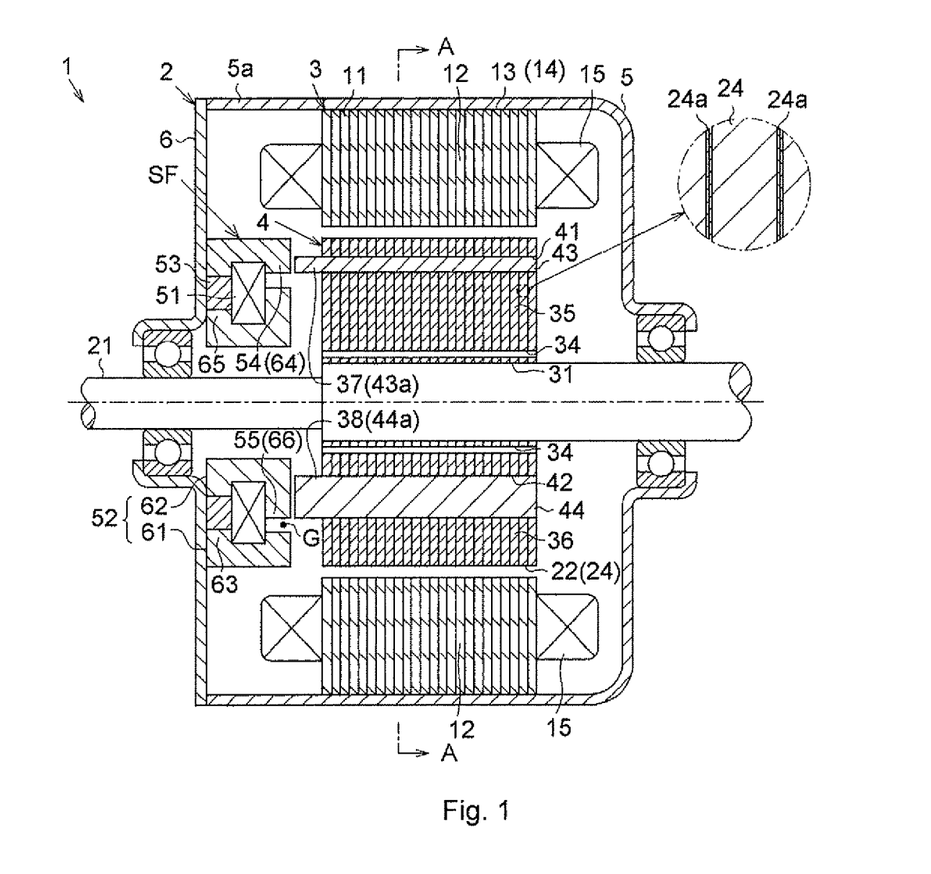
FIG. 1 is a sectional view of an electric motor according to a first embodiment of the invention, taken along the axial direction of the electric motor.
Figure 2:
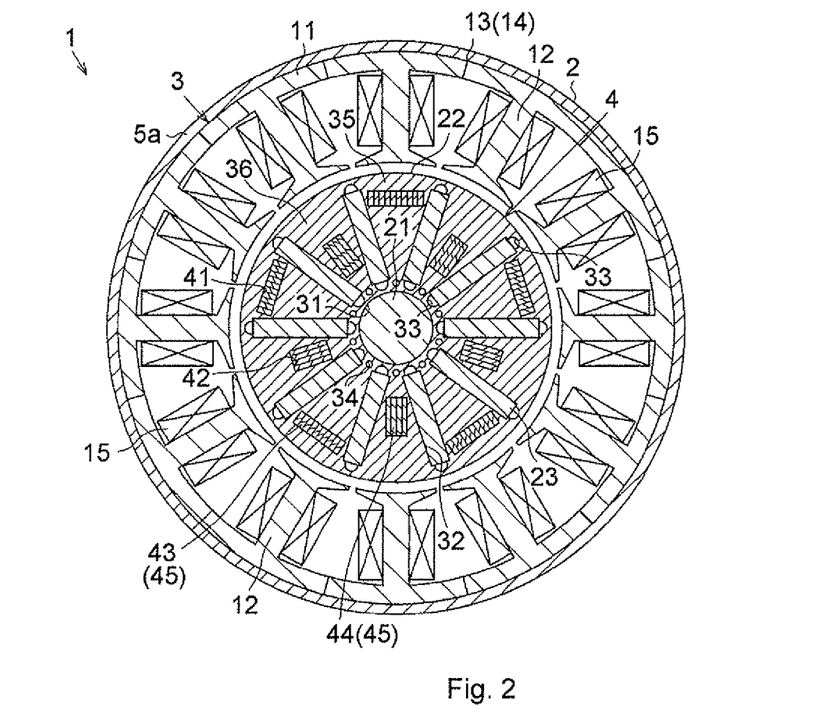
FIG. 2 is a sectional view taken along the line A-A in FIG. 1.

A first embodiment of the invention will be described with reference to the accompanying drawings. An electric motor 1 shown in FIG. 1 and FIG. 2 is used as a drive source of, for example, an electric vehicle or a hybrid vehicle. As shown in FIG. 1 and FIG. 2, the electric motor 1 includes a stator 3 housed in a cylindrical housing 2, and a rotor 4 that is rotatably supported at a position radially inward of the stator 3. The housing 2 is formed of a bottomed cylindrical housing body 5 that is open at one end side (the left side in FIG. 1), and an annular cover 6 provided so as to close the open end of the housing body 5. In the present embodiment, the housing body 5 and the cover 6 are made of a non-magnetic material.

The stator 3 has a stator core 13 formed of a cylindrical portion 11 having a cylindrical shape and fixed to an inner periphery of a tubular portion 5a of the housing body 5, and a plurality of (in the present embodiment, twelve) teeth 12 extending radially inward from the cylindrical portion 11. The stator core 13 is formed by laminating a plurality of magnetic steel sheets 14 such as silicon steel sheets. Multiple (in the present embodiment, twelve) stator coils 15 are wound around the respective teeth 12.

The rotor 4 includes a rotary shaft 21, a columnar rotor core 22 that is fixed to the rotary shaft 21 so as to be rotatable together with the rotary shaft 21, and a plurality of (in the present embodiment, ten) embedded magnets 23 that are embedded in and thus fixed to the rotor core 22. In other words, the rotor 4 according to the present embodiment is structured as a so-called "embedded magnet rotor". The rotary shaft 21 is made of a metal material, and the rotor core 22 is formed by laminating a plurality of magnetic steel sheets 24. As shown in an enlarged view in FIG. 1, insulating films 24a are provided on surfaces of the magnetic steel sheets 24. Thus, in the rotor core 22, magnetic resistance in the axial direction is larger than magnetic resistance in the radial direction.

In the electric motor 1 structured as described above, when three-phase excitation currents are supplied from a control device (not shown) to the stator coils 15, a rotating magnetic field is generated in the stator 3, and the rotor 4 rotates on the basis of the rotating magnetic field.

In the electric motor 1 in the present embodiment, a supplementary field magnet SF is provided on one axial end side (the left side in FIG. 1) of the rotor 4 so as to be apart from the rotor 4. When magnetic flux produced by the supplementary field magnet SF passes through the rotor 4, an amount of magnetic flux that is transmitted between the stator 3 and the rotor 4 is adjusted. A structure for increasing magnetic flux that is transmitted between the stator 3 and the rotor 4 will be described below.

Figure 3:
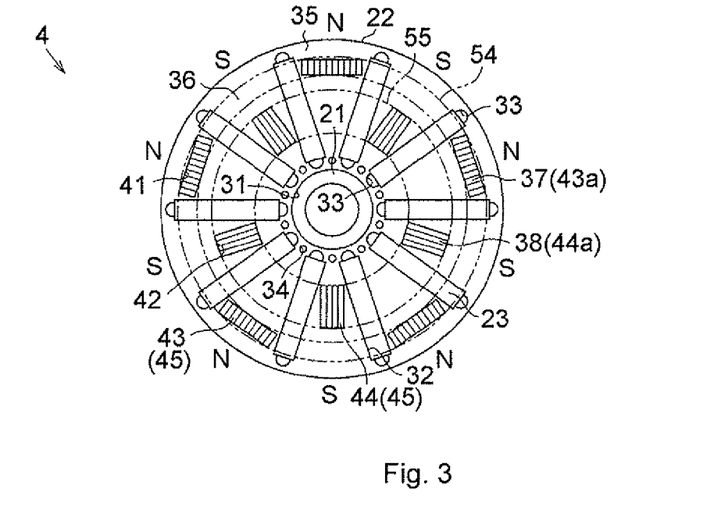
FIG. 3 is a side view of a rotor according to the first embodiment, seen from one axial end side of the electric motor.

First, a structure of the rotor will be described in detail. As shown in FIG. 2 and FIG. 3, a through-hole 31, through which the rotary shaft 21 is passed, is formed at the center of in the rotor core 22. The rotor core 22 has a plurality of hollow portions 32 in which the embedded magnets 23 are arranged. The hollow portions 32 are each formed into a hole having a rectangular sectional shape and extending in the axial direction, and are arranged in the rotor core 22 such that the longitudinal direction of the rectangular sectional shape coincides with the radial direction of the electric motor 1. On each of both radial sides of each hollow portion 32, a bulged portion 33 is formed, which has a generally semicircular sectional shape and is continuous with the hollow portion 32. In a radially inner side portion of the rotor core 22, a plurality of voids 34 is formed. Each of the voids 34 in the present embodiment is formed to have a generally circular sectional shape, extends in the axial direction, and is arranged between the adjacent bulged portions 33.

The embedded magnets 23 are each formed into a flat-plate shape having a rectangular sectional shape corresponding to the sectional shape of the hollow portion 32, and are arranged inside the respective hollow portions 32. In short, the embedded magnets 23 are arranged in a radial fashion. The embedded magnets 23 are magnetized such that portions having the same polarity (the north pole or the south pole) face each other in the circumferential direction, and polarities of magnetic poles (rotor magnetic poles), which are formed on an outer periphery of the rotor core 22 by the embedded magnets 23, are arranged such that the north poles and the south poles are arranged alternately in the circumferential direction. Therefore, among a plurality of generally sector portions of the rotor core 22, which are located between the adjacent hollow portions 32, the sector portions where a magnetic pole with a first polarity (in the present embodiment, the north pole) appears on the outer periphery are formed as first magnetic pole portions 35, and the portions where a magnetic pole with a second polarity (in the present embodiment, the south pole) appears on the outer periphery are formed as second magnetic pole portions 36.

Magnetic flux produced by the embedded magnets 23 is inhibited from passing through the radially outer side of the embedded magnets 23 by the bulged portions 33 arranged radially outward of the embedded magnets 23, and also inhibited from passing through the radially inner side of the embedded magnets 23 by the bulged portions 33 and the voids 34 arranged radially inward of the embedded magnets 23. As the embedded magnets 23 in the present embodiment, for example, ferrite-based bonded magnets (e.g. plastic magnets, rubber magnets) are used.

As shown in FIG. 1 to FIG. 3, the rotor core 22 has first projections 37 that project towards one axial end side of the electric motor 1 from the first magnetic pole portions 35, and second projections 38 that project towards the one axial end side of the electric motor 1 from the second magnetic pole portions 36 and are arranged radially inward of the first projections 37.

Specifically, first insertion holes 41, which pass through the rotor core 22 in the axial direction, are formed in radially outer side portions of the first magnetic pole portions 35, and second insertion holes 42, which pass through the rotor core 22 in the axial direction, are formed in radially inner side portions of the second magnetic pole portions 36. A radial range in which the first insertion holes 41 are formed, and a radial range in which the second insertion holes 42 are formed, are arranged so as not to overlap each other in the circumferential direction. The first insertion holes 41 are each formed to have a rectangular sectional shape such that the longitudinal direction of the rectangular sectional shape is perpendicular to the radial direction of the electric motor 1. The second insertion holes 42 are each formed to have a rectangular sectional shape such that the longitudinal direction of the rectangular sectional shape extends along the radial direction of the electric motor 1. Each first insertion hole 41 and each second insertion hole 42 are formed such that the sectional area of the first insertion hole 41 and the sectional area of the second insertion hole 42 are substantially equal to each other.

Elongate first magnetic bodies 43 and elongate second magnetic bodies 44 are inserted in the first insertion holes 41 and the second insertion holes 42, respectively. The first magnetic bodies 43 are each formed to have a rectangular sectional shape corresponding to the sectional shape of each of the first insertion holes 41, and the sectional area of each first magnetic body 43 is substantially constant throughout the entirety of the first magnetic body 43 in the axial direction. Meanwhile, the second magnetic bodies 44 are each formed to have a rectangular sectional shape corresponding to the sectional shape of each of the second insertion holes 42, and the sectional area of each second magnetic body 44 is substantially constant throughout the entirety of the second magnetic body 44 in the axial direction. Each first magnetic body 43 and each second magnetic body 44 are formed such that the sectional area of the first magnetic body 43 and the sectional area of the second magnetic body 44 are substantially equal to each other. Each of the first magnetic bodies 43 and second magnetic bodies 44 in the present embodiment are formed by laminating magnetic steel sheets 45 such as silicon steel sheets in a direction that is perpendicular to the laminating direction of the magnetic steel sheets 24 that constitute the rotor core 22. Thus, magnetic resistance of the first magnetic bodies 43 and the second magnetic bodies 44 in the axial direction is smaller than magnetic resistance of the rotor core 22 in the axial direction. As in the case of the magnetic steel sheets 24 of the rotor core 22, insulating films are provided on surfaces of the magnetic steel sheets 45. As shown in FIG. 1, the first magnetic bodies 43 and the second magnetic bodies 44 are each formed to be longer than the axial length of the rotor core 22, and one end portions 43a of the first magnetic bodies 43 and one end portions 44a of the second magnetic bodies 44 project beyond one axial end face of the rotor core 22 toward one axial end side of the electric motor 1. In other words, in the present embodiment, the one end portions 43a of the first magnetic bodies 43 are formed as the first projections 37, and the one end portions 44a of the second magnetic bodies 44 are formed as the second projections 38.

Next, a structure of the supplementary field magnet will be described in detail. The supplementary field magnet SF includes an annular supplementary magnet 51 and an annular yoke 52 that serves as a magnetic path for magnetic flux produced by the supplementary magnet 51. In the supplementary field magnet SF, an outer magnetic pole portion 54 is provided, which faces the first projections 37 in the axial direction, and an inner magnetic pole portion 55 is provided, which faces the second projections 38 in the axial direction such that a gap G is formed between the outer magnetic pole portion 54 and the inner magnetic pole portion 55.

Specifically, the yoke 52 includes a generally cylindrical outer member 61, and a generally cylindrical inner member 62 that is arranged radially inward of the outer member 61. The outer member 61 and the inner member 62 are each formed of a powder magnetic core. At one end portion of the outer member 61 (an end portion on the opposite side of the outer member 61 from the rotor 4), an annular fixed flange portion 63 is formed, which extends radially inward. At the other end portion of the outer member 61 (an end portion on the rotor 4 side), an annular opposed flange portion 64 is formed, which extends radially inward. The outer member 61 is arranged coaxially with the rotor 4 and fixed to the inner face of the cover 6 such that the opposed flange portion 64 is opposed to the first projections 37 in the axial direction. In other words, in the present embodiment, the opposed flange portion 64 is formed as the outer magnetic pole portion 54. Meanwhile, at one end portion of the inner member 62, an annular fixed flange portion 65 is formed, which extends radially outward. At the other end portion of the inner member 62, an annular opposed flange portion 66 is formed, which extends radially outward. The inner member 62 is arranged coaxially with the rotor 4 and fixed to the inner face of the cover 6 such that the opposed flange portion 66 is opposed to the second projections 38 in the axial direction. In other words, in the present embodiment, the opposed flange portion 66 is formed as the inner magnetic pole portion 55.

The outer member 61 and the inner member 62 are fixed to the cover 6 so as to be apart from each other in the radial direction. Thus, the gap G is formed between the opposed flange portion 64 (the outer magnetic pole portion 54) and the opposed flange portion 66 (the inner magnetic pole portion 55). A radial width of the gap G is set larger than each of both an axial clearance between the opposed flange portion 64 and each first projection 37, and an axial clearance between the opposed flange portion 66 and each second projection 38. A radial width of the opposed flange portion 64 and a radial width of the opposed flange portion 66 are set such that the opposed flange portion 64 and the opposed flange portion 66 face the entirety of one end face of each first projection 37 and the entirety of one end face of each second projection 38, respectively (see FIG. 3).

The supplementary magnet 51 is fixed at a position between the fixed flange portion 63 of the outer member 61 and the fixed flange portion 65 of the inner member 62, and the yoke 52 (the outer member 61 and the inner member 62) is included in the magnetic path for magnetic flux produced by the supplementary magnet 51. The supplementary magnet 51 and the fixed flange portions 63, 65 are in close contact with each other. The supplementary magnet 51 is magnetized such that the first polarity appears on a radially outer side of the supplementary magnet 51, and the second polarity appears on a radially inner side of the supplementary magnet 51. Thus, the first polarity appears in the outer magnetic pole portion 54 of the yoke 52, and the second polarity appears in the inner magnetic pole portion 55. As the supplementary magnet 51 in the present embodiment, a ferrite-based sintered magnet, for example, is used.

Figure 4:
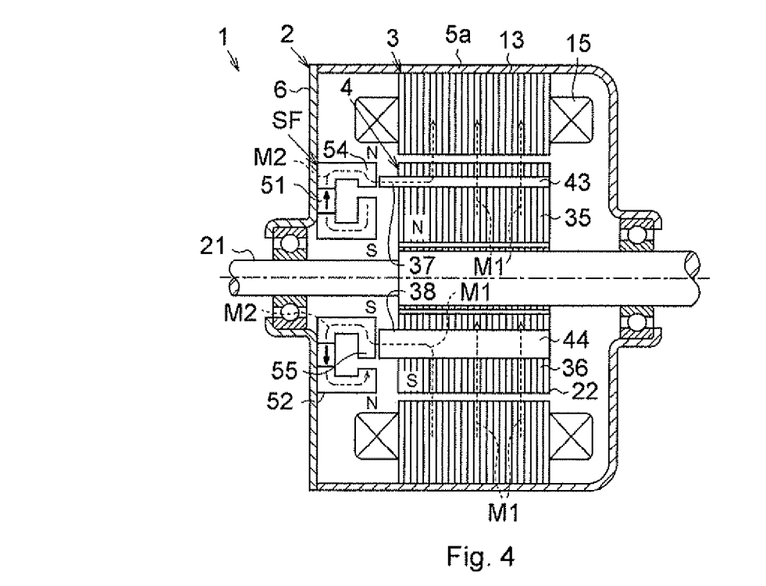
FIG. 4 is an operation explanatory view showing flows of magnetic flux in the electric motor according to the first embodiment.

Next, operations of the supplementary field magnet in the electric motor according to the present embodiment will be described. Because the outer magnetic pole portion 54 faces the first projections 37, magnetic flux that passes through the outer magnetic pole portion 54 enters or exits from the first magnetic pole portions 35 of the rotor core 22 mainly through the first projections 37. Because the inner magnetic pole portion 55 faces the second projections 38, magnetic flux that passes through the inner magnetic pole portion 55 enters or exits from the second magnetic pole portions 36 of the rotor core 22 mainly through the second projections 38. As shown in FIG. 4, because the outer magnetic pole portion 54 and the inner magnetic pole portion 55 have the same polarities as the first magnetic pole portions 35 and the second magnetic pole portions 36, respectively, magnetic flux M2 of the supplementary magnet 51 is added to magnetic flux M1 of the embedded magnets 23, which passes through the outer periphery of the rotor core 22. Thus, magnetic flux that is transmitted between the stator 3 and the rotor 4 is increased. In FIG. 4, the magnetization direction of the supplementary magnet 51 is shown by arrows.

More specifically, the magnetic flux M2 from the outer magnetic pole portion 54 enters the first magnetic pole portions 35 through the first projections 37, enters the second magnetic pole portions 36 through the stator 3 like the magnetic flux M1 produced by the embedded magnets 23, and then returns to the inner magnetic pole portion 55 through the second projections 38. Thus, magnetic flux that is transmitted between the stator 3 and the rotor 4 is increased, which makes it possible to generate high torque. As described above, the magnetic flux M2 produced by the supplementary field magnet SF enters the rotor 4 through one of the first projections 37 and the second projections 38, and exits from the rotor 4 through the other one of the first projections 37 and the second projections 38. Therefore, the magnetic flux M2 hardly passes through the tubular portion 5a of the housing 2. In other words, the tubular portion 5a does not serve as a magnetic path for the magnetic flux produced by the supplementary field magnet SF.

As described so far, the present embodiment produces the following advantageous effects.

(1) Magnetic flux that is transmitted between the stator 3 and the rotor 4 is increased by providing the supplementary field magnet SF on one axial end side of the rotor 4. Therefore, it is possible to increase a magnetic flux density on the outer periphery of the rotor core 22 without using embedded magnets having a large maximum energy product, and it is thus possible to increase magnet torque easily. In addition, the tubular portion 5a does not serve as a magnetic path for magnetic flux produced by the supplementary field magnet SF. Therefore, even if the thickness of the tubular portion 5a is reduced, magnetic resistance of the tubular portion 5a is not increased. Therefore, it is possible to easily reduce the size of the electric motor 1 in the radial direction.

(2) The first projections 37 and the second projections 38 are formed such that the area of the section of each first projection 37 and the area of the section of each second projection 38, the sections being perpendicular to the axial direction, are equal to each other. The first projections 37 and the second projections 38 serve as magnetic paths for magnetic flux produced by the supplementary field magnet SF. Therefore, even when only the sectional area of either one of each first projection 37 and each second projection 38 is increased, magnetic flux that is transmitted between the supplementary field magnet SF and the rotor 4 is not increased if the other one of each first projection 37 and each second projection 38 has a smaller sectional area and thus has large magnetic resistance. Therefore, by making the sectional area of each first projection 37 and the sectional area of each second projection 38 equal to each other as described in the present embodiment, it is possible to efficiently increase magnetic flux that is transmitted between the supplementary field magnet SF and the rotor 4.

(3) Because the rotor core 22 is formed by laminating the plurality of magnetic steel sheets 24 in the axial direction, it is possible to suppress generation of an eddy current. However, in the rotor core 22 that is formed by laminating the magnetic steel sheets 24 as described above, magnetic resistance in the axial direction is larger than magnetic resistance in the radial direction. Therefore, magnetic flux is less likely to flow thorough the rotor core 22 in the axial direction. Thus, for example, at positions in the rotor core 22, which are distant from the supplementary field magnet SF, the amount of magnetic flux from the supplementary field magnet SF may be small. As a result, magnetic flux that is transmitted between the stator 3 and the rotor 4 may vary in the axial direction.

However, in the present embodiment, the first projections 37 are formed of the one end portions 43a of the elongate first magnetic bodies 43 that are inserted into the first insertion holes 41 formed in the first magnetic pole portions 35 and that have smaller magnetic resistance in the axial direction than the magnetic resistance of the rotor core 22 in the axial direction. Further, the second projections 38 are formed of the one end portions 44a of the elongate second magnetic bodies 44 that are inserted into the second insertion holes 42 formed in the second magnetic pole portions 36 and that have smaller magnetic resistance in the axial direction than the magnetic resistance of the rotor core 22 in the axial direction. Therefore, because magnetic flux passes through the elongate first magnetic bodies 43 and the elongate second magnetic bodies 44, the magnetic flux flows easily through the rotor core 22 in the axial direction. As a result, it is possible to suppress axial variation of magnetic flux that is transmitted between the stator 3 and the rotor 4.

(4) The embedded magnets 23 are each formed into a flat-plate shape, are arranged in the rotor core 22 in a radial fashion, and are magnetized such that the portions of the adjacent embedded magnets 23, which have the same polarity, face each other in the circumferential direction. Therefore, it is possible to form each of the first magnetic pole portions 35 and the second magnetic pole portions 36 into a shape that spreads over a wide range in the radial direction, and to make the area of each of the first magnetic pole portions 35 and the second magnetic pole portions 36 large as viewed from the axial direction. It is thus possible to increase sectional areas of the first projections 37 and the second projections 38, thereby effectively increasing magnetic flux that is transmitted between the stator 3 and the rotor 4.

Next, a second embodiment of the invention will be described with reference to the accompanying drawings. The present embodiment and the foregoing first embodiment differ mainly in the structures of first projections and second projections. Therefore, for convenience of explanation, the same reference numerals will be used to refer to the same configurations as those in the first embodiment, and explanation thereof will be omitted.

Figure 5:
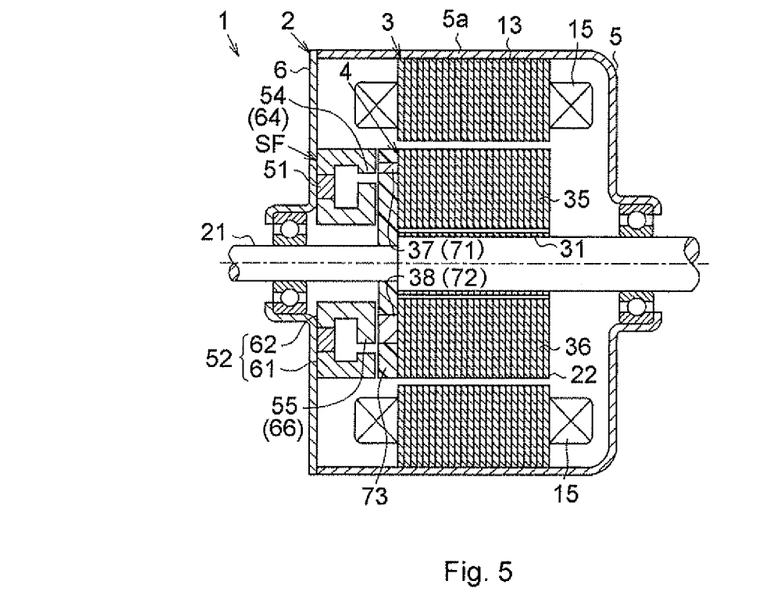
FIG. 5 is a sectional view of an electric motor according to a second embodiment of the invention, taken along the axial direction of the electric motor.
Figure 6:
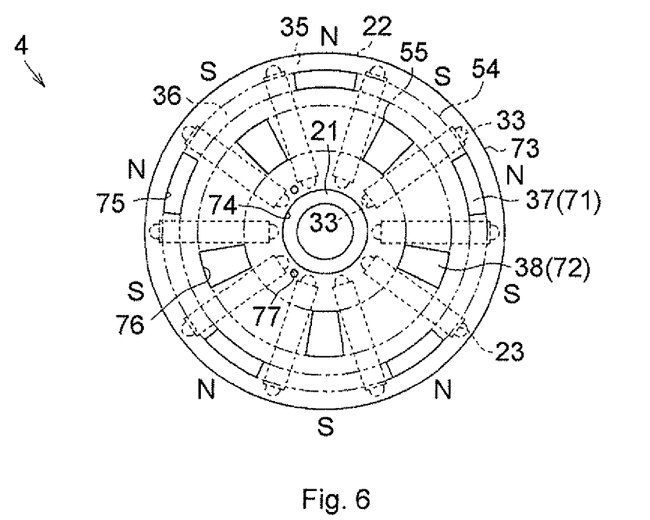
FIG. 6 is a side view of a rotor according to the second embodiment, seen from one axial end side of the electric motor.

As shown in FIG. 5 and FIG. 6, in one axial end face of each first magnetic pole portion 35, a short first magnetic body 71 is arranged at a position that is opposed to the outer magnetic pole portion 54 in the axial direction. In one axial end face of each second magnetic pole portion 36, a short second magnetic body 72 is arranged at a position that is opposed to the inner magnetic pole portion 55 in the axial direction. The first magnetic body 71 and the second magnetic body 72 in the present embodiment are each formed of a powder magnetic core. Shapes of sections of the first magnetic body 71 and the second magnetic body 72, the sections being perpendicular to the axial direction, are each formed into a generally sector shape, such that the sectional area of each first magnetic body 71 is substantially constant throughout the entirety of the first magnetic body 71 in the axial direction and the sectional area of each second magnetic body 72 is substantially constant throughout the entirety of the second magnetic body 72 in the axial direction. The first magnetic bodies 71 and the second magnetic bodies 72 are held by a holder 73 that is fixed to one axial end face of a rotor core 22. The holder 73 in the present embodiment is made of a resin material.

The holder 73 is formed into a disc shape, and a through-hole 74, through which a rotary shaft 21 is passed, is formed at the center of the holder 73. Fitting holes 75, 76, into which the first magnetic body 71 and the second magnetic body 72 are fitted, are formed in the holder 73 at positions corresponding to the first magnetic body 71 and the second magnetic body 72, respectively. The holder 73 is fixed to the rotor core 22 by an adhesive or the like. In the holder 73, multiple positioning holes 77 are formed at positions that are opposed to the voids 34 of the rotor 4, and the holder 73 is positioned easily with respect to the rotor core 22 by inserting pins (not shown), which have been inserted in the positioning holes 77, into the voids 34.

As in the first embodiment, in the electric motor 1 according to the present embodiment, magnetic flux that is transmitted between the stator 3 and the rotor 4 is increased as magnetic flux produced by the supplementary field magnet SF enters or exits from the rotor 4 through the first projections 37 and the second projections 38.

As described above, according to the present embodiment, the following advantageous effects are obtained in addition to the effects (1), (2) and (4) of the foregoing first embodiment.

(5) The first projections 37 are formed of the short first magnetic bodies 71 that are fixed to the positions on the one axial end faces of the first magnetic pole portions 35, the positions being opposed to the outer magnetic pole portion 54. The second projections 38 are formed of the short second magnetic bodies 72 that are fixed to the positions on one axial end faces of the second magnetic pole portions 36, the positions being opposed to the inner magnetic pole portion 55. Therefore, as compared to a case where insertion holes are formed in the first magnetic pole portions 35 and the second magnetic pole portions 36 and magnetic bodies are inserted in the insertion holes (for example, the foregoing first embodiment), it is possible to efficiently suppress an increase in magnetic resistance of the first magnetic pole portions 35 and the second magnetic pole portions 36 in the radial direction.

(6) The first magnetic bodies 71 and the second magnetic bodies 72 are fixed to the rotor core 22 by the holder 73. Therefore, it is possible to make magnetic resistance between the first magnetic bodies 71 and the second magnetic bodies 72, and the rotor core 22 smaller than that in a case where the first magnetic bodies 71 and the second magnetic bodies 72 are fixed to the rotor core 22 with the use of, for example, an adhesive.

Note that the foregoing embodiments may be modified as follows.

Figure 7:
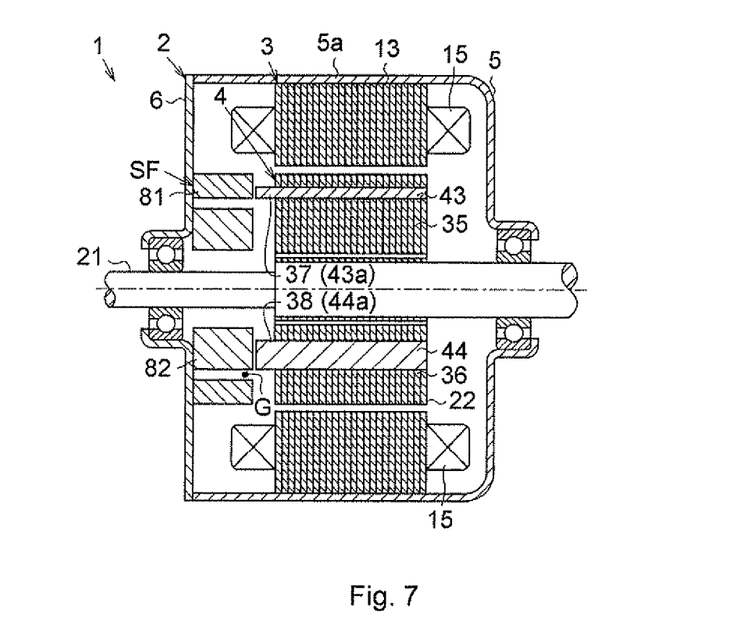
FIG. 7 is a sectional view of an electric motor according to another embodiment of the invention, taken along the axial direction of the electric motor.

In the foregoing embodiments, the supplementary field magnet SF is formed of the supplementary magnet 51 and the yoke 52. However, the present invention is not limited to this configuration, and the supplementary field magnet SF may be formed only of a plurality of supplementary magnets 51. Specifically, in an example shown in FIG. 7, a supplementary field magnet SF includes an annular first supplementary magnet 81 that faces the first projections 37 in the axial direction, and an annular second supplementary magnet 82 that is arranged radially inward of the first supplementary magnet 81 and that faces the second projections 38 in the axial direction. The first supplementary magnet 81 is magnetized in the axial direction such that the first polarity appears on the rotor 4 side, and the second polarity appears on the opposite side of the first supplementary magnet 81 from the rotor 4. An end portion of the first supplementary magnet 81, which is on the rotor 4 side, is formed as an outer magnetic pole portion 54. Meanwhile, the second supplementary magnet 82 is magnetized in the axial direction such that the second polarity appears on the rotor 4 side, and the first polarity appears on the opposite side of the second supplementary magnet 82 from the rotor 4. An end portion of the second supplementary magnet 82, which is on the rotor 4 side, is formed as an inner magnetic pole portion 55. In this example, the cover 6 is made of a magnetic material. Thus, the cover 6 functions as a magnetic path that connects the end portion of the first supplementary magnet 81, which is on the opposite side of the first supplementary magnet 81 from the rotor 4, to the end portion of the second supplementary magnet 82, which is on the opposite side of the second supplementary magnet 82 from the rotor 4. Therefore, it is possible to enhance magnetic efficiency of the first supplementary magnet 81 and the second supplementary magnet 82.

Figure 8A:
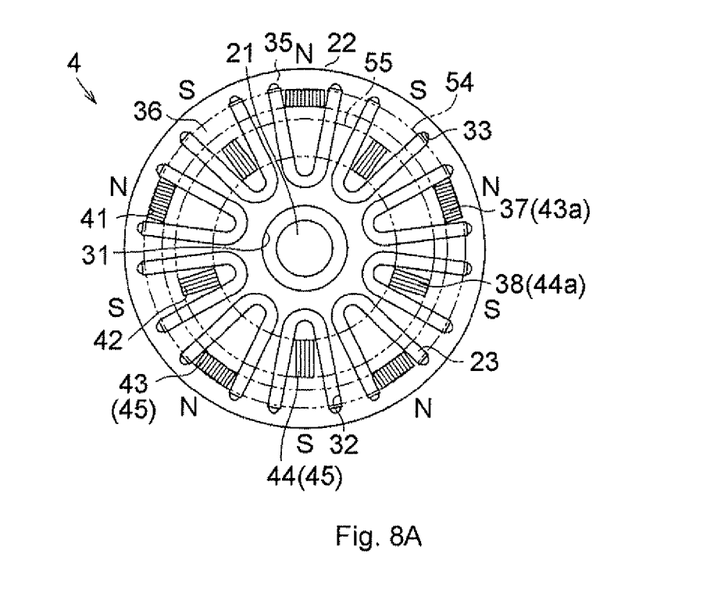
FIG. 8A and FIG. 8B are side views of rotors according to other embodiments, seen from one axial end side of an electric motor.

In the foregoing first embodiment, the plurality of flat-plate-shaped embedded magnets 23 are arranged in the rotor core 22 in a radial fashion. However, the invention is not limited to this configuration. For example, U-shaped embedded magnets 23, which are open toward the radially outer side, may be arranged in a circular manner as shown in FIG. 8A. In this case, inner regions of the embedded magnets 23, which are magnetized such that radially outer portions of the embedded magnets 23 have a first polarity, serve as first magnetic pole portions 35. Further, inner regions of the embedded magnets 23, which are magnetized such that the radially outer portions of the embedded magnets 23 have a second polarity, serve as second magnetic pole portions 36. First projections 37 and second projections 38 project from the first magnetic pole portions 35 and the second magnetic pole portions 36, respectively, toward one axial end side of the electric motor 1, and formed so as not to overlap each other in the circumferential direction.

Figure 8B:
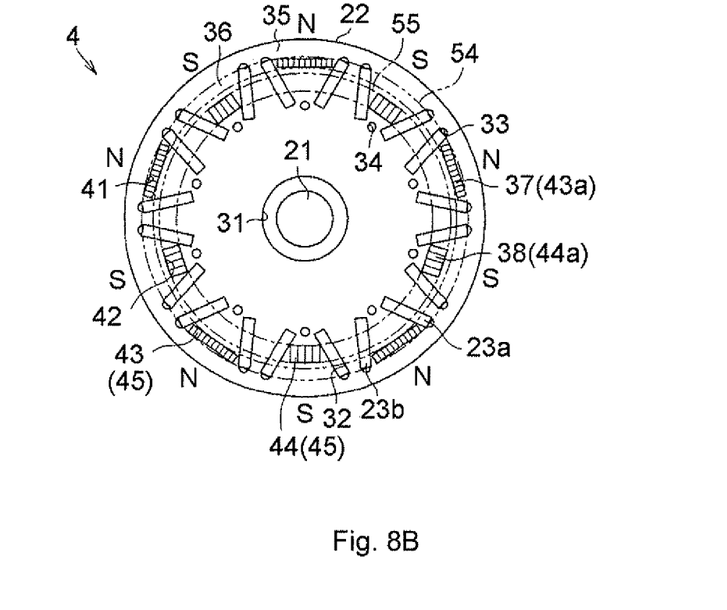

As shown in FIG. 8B, a plurality of pairs of embedded magnets 23a, 23b, which are magnetized such that portions having the same polarity faces each other in the circumferential direction, may be arranged in a circular manner. In this case, regions in the rotor core 22, which are between the embedded magnets 23a, 23b and in which the portions having the first magnetic pole faces each other, serve as first magnetic pole portions 35, and regions in the rotor core 22, which are between the embedded magnets 23a, 23b and in which the portions having second magnetic pole faces each other, serve as second magnetic pole portions 36. First projections 37 and second projections 38 project from the first magnetic pole portions 35 and the second magnetic pole portions 36, respectively, towards one axial end side of the electric motor 1, and formed so as not to overlap each other in the circumferential direction.

In short, for example, the shape and arrangement of the embedded magnets 23 may be changed as appropriate as long as the first projections 37 projecting from the first magnetic pole portions 35 and the second projections 38 projecting from the second magnetic pole portions 36 are provided so as not to overlap each other in the circumferential direction. Similarly, in the foregoing second embodiment, for example, the shape and arrangement of the embedded magnets 23 may be changed as appropriate.

In the foregoing first embodiment, the first magnetic bodies 43 and the second magnetic bodies 44 are each formed by laminating the magnetic steel sheets 45 in a direction perpendicular to the laminating direction of the magnetic steel sheets 24 that constitute the rotor core 22. However, as long as the first magnetic bodies 43 and the second magnetic bodies 44 each have smaller magnetic resistance in the axial direction than the magnetic resistance of the rotor core 22 in the axial direction, the first magnetic bodies 43 and the second magnetic bodies 44 may be formed of, for example, a powder magnetic core.

In the foregoing second embodiment, the first magnetic bodies 71 and the second magnetic bodies 72 are fixed to the rotor core 22 by the holder 73. However, the invention is not limited to this configuration, and the first magnetic bodies 71 and the second magnetic bodies 72 may be fixed to the rotor core 22 by, for example, an adhesive.

In each of the foregoing embodiments, each first projection 37 and each second projection 38 may be formed to have sectional areas different from each other.

In each of the foregoing embodiments, ferrite-based bonded magnets are used as the embedded magnets 23. However, the invention is not limited to this configuration, and, other magnets such as neodymium-based sintered magnets may be used as the embedded magnets 23. Similarly, as the supplementary magnet 51, a magnet other than a samarium-cobalt-based sintered magnet may be used.

In each of the foregoing embodiments, the rotor core 22 may be provided with the first projections 37 and the second projections 38 that project toward both axial sides of the electric motor 1 from the first magnetic pole portions 35 and the second magnetic pole portions 36, respectively, and, the supplementary field magnet SF may be provided on each of both axial sides of the rotor 4.

In each of the foregoing embodiments, the outer member 61 and the inner member 62, and the first magnetic bodies 71 and the second magnetic bodies 72 are each formed of a powder magnetic core. However, low carbon steel, for example, may also be used to form these portions.

In each of the foregoing embodiments, the first polarity may be the south pole, and the second polarity may be the north pole.

In each of the foregoing embodiments, the invention is applied to the electric motor 1 that is used as a drive source for an electric vehicle and a hybrid vehicle. However, application of the invention is not limited to this, and the invention may be applied to a drive source for other devices such as an electric power steering system, or may be applied to a generator.

What is claimed is:

1. An electric motor, comprising:

a stator fixed to an inner periphery of a housing; and a rotor arranged radially inward of the stator, and having a rotor core and a plurality of embedded magnets that are embedded in the rotor core so as to be fixed to the rotor core, the embedded magnets being arranged such that a magnetic pole with a first polarity and a magnetic pole with a second polarity are arranged alternately in a circumferential direction on an outer periphery of the rotor, wherein the rotor core is provided with a first projection that projects toward at least one axial side of the electric motor from a first magnetic pole portion of the rotor core, in which the magnetic pole with the first polarity appears in the outer periphery, and a second projection that projects toward at least one axial side of the electric motor from a second magnetic pole portion of the rotor core, in which the magnetic pole with the second polarity appears in the outer periphery, the second projection being arranged radially inward of the first projection;

on at least one axial side of the rotor, a supplementary field magnet having a supplementary magnet is arranged;

the supplementary field magnet includes an outer magnetic pole portion that has the first polarity and that faces the first projection in an axial direction, and an inner magnetic pole portion that has the second polarity and that faces the second projection in the axial direction such that a gap is formed between the inner magnetic pole portion and the outer magnetic pole portion;

the rotor core is formed by laminating a plurality of magnetic steel sheets in the axial direction;

a first insertion hole, which is open toward at least one axial side, is formed in the first magnetic pole portion at a position that is opposed to the outer magnetic pole portion, and a second insertion hole, which is open toward at least one axial side, is formed in the second magnetic pole portion at a position that is opposed to the inner magnetic pole portion;

the first projection is formed of an elongate first magnetic body that is inserted into the first insertion hole, and has smaller magnetic resistance in the axial direction than magnetic resistance of the rotor core in the axial direction; and the second projection is formed of an elongate second magnetic body that is inserted into the second insertion hole, and has smaller magnetic resistance in the axial direction than magnetic resistance of the rotor core in the axial direction.

* * * * *